SELECTION SYSTEMS

Filed May 9, 1962 5 Sheets-Sheet 1

Inventors
J. P. L. BASSET
R. L. BIZOLLIER
P. A. CAMUS
By [signature]
Attorney

Inventors
J. P. L. BASSET
R. L. BIZOLLIER
P. A. CAMUS
By [signature]
Attorney

Inventors
J.P.L. BASSET
R.L. BIZOLLIER
P.A. CAMUS
By [signature]
Attorney

SELECTION SYSTEMS

Filed May 9, 1962 5 Sheets-Sheet 4

Inventors
J.P.L. BASSET
R.L. BIZOLLIER
P.A. CAMUS
By [signature]
Attorney

Inventors
J.P.L. BASSET
R.L. BIZOLLIER
By P.A. CAMUS
Attorney

United States Patent Office 3,283,081

Patented Nov. 1, 1966

3,283,081
SELECTION SYSTEMS

Jacques Pierre Louis Basset and Rene Leon Bizollier, Paris, and Pierre Albert Camus, Antony, Seine, France, assignors to International Standard Electric Corporation, New York, N.Y., a corporation of Delaware Filed May 9, 1962, Ser. No. 193,502
Claims priority, application France, May 10, 1961, 861,351, Patent 1,296,679
5 Claims. (Cl. 179—18)

The present invention relates in general to selection systems for electric circuits or equipment and in particular to selection system for PBX telephone exchanges.

A number of solutions have already been proposed for completing the selection of an idle line in a PBX group. One of these solutions consists in arranging the various lines of a group in a consecutive way on the banks of the final selector; the latter receives the selecting code of the group concerned and hunts the first line. If this line is idle, the call is completed; if not, the selector hunts the following line, the same process is repeated until an idle line is found. Such a method presents several drawbacks. The number of lines in the group is strictly limited and it is impossible to add new ones without utilizing another code. As each of these lines occupies an ordinary subscriber's position on the banks of the selector, the selecting code corresponding to this position is left unused and all a series of numbers is wasted. Lastly, the final selector must route a heavy traffic; the grouped lines are generally assigned to public services or to important firms, the number of calls during the peak hour being great in comparison with that of the lines assigned to the ordinary subscribers.

According to another method, the grouped lines are connected onto the banks of the hundreds selectors, but hundred numbers are sacrificed for a single group.

In certain systems utilizing crossbar multiswitches, the last selection stage or line selection stage combines at least two selectors arranged in series. This is equivalent to a single high-capacity selector. A marking distributing frame enables total independence between a subscriber number and its position on the banks of the selection stage. The problem concerning the grouped lines is therefore simplified. The extensions can be realized more easily, but the presence of such lines causes a considerable overload of traffic in this selection stage.

According to an alternative, the line selection stage receives the selecting code of the group, as previously, but in that case, the register is informed, and it reroutes the call onto a previous selection stage or onto a group selection stage giving direct access to the PBX lines. Thus, the overload of traffic of the line selection stage is avoided, but the establishment of the call is delayed and common checking and control units are occupied unnecessarily.

Lastly, these difficulties can be resolved by utilizing subscriber general translators which enable a total independence between the subscriber numbers and their positions on the bank of selectors, but it is necessary to systematically analyse all the codes, requiring complicated translators.

An object of the invention is to provide a system for the selection of grouped lines, the said system eliminates all these drawbacks by economical and simple means.

A more specific object of the present invention is to provide means to connect the PBX line group onto the banks of any selection stage and to obtain, in the exchange, the total independence between the numbers of these lines and their positioning on the banks of the selectors. This object is accomplished by making two successive analyses of the dialled code, the first one dealing with a limited number of digits and determining if the call concerns a PBX line, the second one is made only if the call does concern a PBX line. It deals with the complete code to deduce from it the selective combinations necessary to the routing of the call either onto an idle line of a group, or onto an ordinary line. The two step process avoids the systematic translation of all the codes of the exchange.

A feature of the invention is that the code dialled by the calling-subscriber is received in an outgoing register having access to a general translator. The general translator checks, after the analysis of a limited number of digits, to determine if the call is likely to concern a group of lines, and then it switches the chain of selection over a particular feed-junctor having access to an intermediate register, and a local translator. The complete code received in the outgoing register is then retransmitted to the intermediate register, and from there, to the local translator by any appropriate means.

Another object of the invention is to provide equipment called "local junctor" having access to the outgoing registers. A call coming from a distant exchange is received on an equipment called "incoming junctor." Both the local junctors and the incoming junctors have access to the same outgoing registers, and, from there, to the same general translator. This arrangement enables both the general translator and the local translator to operate under identical conditions, whatever the origin of the call may be.

According to an alternative, another feature of the invention is that the incoming junctors have access to specialized incoming registers which can be connected to the same local translators as the intermediate registers. The local translator analyses, in the case of an incoming call, a limited number of digits and informs the register when the call can concern a particular group of lines. The register then releases the translator to reseize it and to send it the complete code. The local translator then operates under the same conditions as if it had been seized by an intermediate register.

According to an alternative, another feature of the invention relates to the fact that the outgoing register can have access, through the connecting units or "couplers," either to the general translators, or to the local translators. In case specialized incoming registers should be provided for, the latter have access, through the couplers, to the same local translators as the outgoing registers.

Another feature of the invention relates to the fact that, in certain particular cases (isolated exchanges, i.e., exchanges which have no automatic link with the outside) only one type of translator is utilized, the said translator acts both as a general translator and a local translator, such a translator analyses a limited number of digits and informs the register when the call is likely to concern a group of lines. The register then releases the translator in order to seize it again ulteriorly and to send it the complete code, that is, all of the necessary units to route the call either onto an idle line of a group, or onto an ordinary line.

Another feature of the invention relates to the fact that, before transmitting the complete code to the local translator, the register substitutes an equivalent translated code to the first digits. The equivalent code has only one digit, thereby limiting the number of the digits to be analysed.

Another feature of the invention relates to the fact that, when the local translator is seized by the incoming register for the first time, the said translator receives a particular signal informing it to analyse the first digits and to disclose a call likely to concern a group of lines. When the local translator is seized for the second time, it receives another signal informing it to proceed with the complete analysis of the code in order to deduce and sort out the selective combinations necessary for the routing of the call.

Other objects and features of the invention will become apparent from the following description, as an unrestrictive example, with reference to the accompanying drawings in which.

Figure 1:
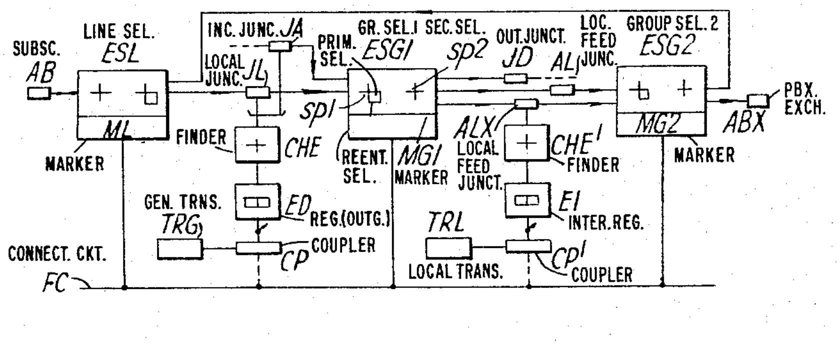
FIGURE 1, shows in block-diagram form the general operation of the system.

By referring to FIGURES 1 to 4, an embodiment of the invention in the case of a telephone system utilizing crossbar multiswitches with an average capacity and with one marker per stage, will now be described. Such a system is set out in detail among other places, in the following U.S. Patents assigned to the assignee of this invention: 2,770,676, 2,810,018, 2,853,556, 2,911,477, 2,932,695, 3,049,594 and 3,059,055.

It will be supposed that each subscriber is characterized, in the whole network, by a 7-digit code. The first three digits form the office code, and will be indicated in the following by the letters P, Q, R; the last four digits form the numerical part and will be respectively indicated by the letters M, C, D, U (thousands, hundreds, tens, units). A single exchange can serve, say 50,000 subscribers, i.e., 5 tens of the thousand group each corresponding to a various office code.

*General arrangement of the equipment.*—To connect two local substations such as AB (FIG. 1) two selection chains are used, one on calling-subscriber's side, and the other on called-subscriber's side. The chain of selection on calling-subscriber's side is formed by the line selection unit ESL. The chain of selection on the called-subscriber's side is formed by both the group selection unit ESG1–ESG2 and the line selection unit ESL.

The group selection unit ESG1 gives access to the local feed-junctors, such as junctors AL, ALX on the one hand, to the outgoing junctors of outgoing circuits such as junctors JD on the other hand. Selection unit ESG1 does not make any numerical selection in the case of local calls. The selection of the tens of the thousand-group and the thousands is made by the group selection unit ESG2. The selection of the subscriber station in the thousands is made by the line selection unit ESL.

The various selection units ESG1, ESG2, ESL are all similar. Thus, by way of example, the group selection unit ESG1 consists in two stages of selectors, the primary selectors SP1 and the secondary selectors SP2. In the case the primary selector has no direct access to the secondary selector having an idle line in the dialled level, a reentry selector is placed between the primary and secondary selectors, in the same frame as the primary selector. Both the primary selector and the secondary selector are diagrammatically represented by crosses, the vertical stroke corresponds to the outlets and the horizontal strokes correspond to the inlets. The block ent, the reentry selector, shows the link existing between an outlet of the primary selector and the inlet such as stroke SP1. A common control and checking unit MG1, or marker, receives the selective indications in case of need and orients the selections.

The feed-junctor AL arranged between the group selection units ESG1 and ESG2, current-supplies the subscriber stations and maintains the various selectors seized during the duration of the call.

The two chains of selection on the calling side and the called side are connected by means of a local junctor JL, associated with a primary selector of the line selection unit ESL and with a primary selector of the group selection unit ESG1. The local junctor JL gives access, through a finder CHE to outgoing registers, such as ED. The register ED has access, through a coupler CP, to general translators TRG.

For transmitting the selective indications of the register ED or of the translator TRG to the various markers MG1, MG2, ML, a connecting circuit FC is utilized. The circuit FC involves a sufficient number of wires to send several digits at the same time and in a practically instantaneous manner. In practice, each digit is transmitted by putting an electrical in the well-known "Two out of five" code, whereby 5 x *n* wires are provided for, if *n* digits must be transmitted simultaneously. When a selection has been made by a marker, the connecting circuit is also utilized to transmit the class of service indication of the chosen line to the register. Of course, the connecting circuit is immobilized only during the time strictly necessary. In particular it is seized twice for each selection, first, for transmitting the selective indications from the register or from the translator to the marker, and afterwards for transmitting the class indication of the chosen line in the opposite direction.

The subscriber grouped-lines equipment (PBX) is indicated by the reference ABX. It is directly connected onto the banks of the group selection unit ESG2. In the following only the important PBX groups will be considered, i.e., the groups having a certain number of heavy-traffic lines. The feed-junctor ALX is utilized instead of the feed-junctor AL when the general translator TRG checks, after the analysis of a limited number of digits, to determine if the call is likely to concern a PBX subscriber. The feed-junctor is connected, through the finder CHE', to an intermediate register EI. The register has access to a local translator TRL through the coupler CP'.

The local translator analyses the complete code in order to deduce from it the translated digits necessary to the selection of the ABX subscriber by the group selection unit ESG2. Of course, if the local translator TRL, by analysing the first digits received, checks that the call is intended for an ordinary subscriber AB, it only sends the marker MG2 the translated digits necessary to the orientating of ESG2 onto a line selection unit ESL serving the required thousands.

The outgoing junctors JD associated with the outgoing circuits are directly connected onto the group selection units ESG1; in case of an outgoing call, the above-mentioned unit makes the numerical selection of the required group of lines.

Each incoming circuit junctor JA is connected onto a primary selector SP1 of the group selection unit ESG1.

The incoming junctors JA as well as the local junctors JL have access, through finders CHE, to the registers ED. Thus, the latter deal with the local calls, the outgoing calls and the incoming calls, but they are still called outgoing registers to distinguish them from the specialized incoming registers represented in the alternative of FIGS. 5 and 6.

*Local call to an ordinary subscriber station AB.*—When a subscriber at station AB calls, he is connected by means of a line selection unit ESL, to a local junctor JL. The latter gets connected to an available outgoing register ED through a register finder CHE. The code dialled by the subscriber is received in the register ED. Immediately at the reception of the office code PQR, the register gets connected to an available general translator TRG through the coupler CP and transmits this office code to the said translator. The translator TRG can disclose the local character of the call, but it does not have digits enough to know if the said call concerns a PBX subscriber. It informs the register ED about that, and then it releases. When the register has received the two following digits, i.e., the thousands M and the hundreds C, it calls the translator again and transmits both an indication T characterizing the tens of thousand group in the exchange and the digits M and C to the said translator. The indication T is obtained in the register by only translating the office code PQR. The translator, which thus knows the called-subscriber's hundreds, is able to determine if this hundreds contains one or several PBX groups.

It will be assumed first, that the dialled hundreds does not contain any PBX group. The translator at this moment, possesses all the elements necessary to control the orientating of the group selection unit ESG1 onto a local feed-junctor AL. Then, the selection can start. The coupler CP, informed by the translator TRG, transmits an appropriate signal to the group selection unit ESG1 through register ED, local junctor JL and feeder CHE. Responsive to the receipt of the signal by selector ESG1, an available marker MG1 is seized, the latter getting connected to a connecting circuit FC which is available, too. The marker MG1 transmits the number of the chosen connecting circuit to the coupler CP, through group selector ESG1, local junctor JL, feeder CHE, and register ED. The coupler CP, which knows the connecting circuit number, gets connected in its turn.

The one or several translated digits necessary to the orientating of the group selection unit ESG1 are transmitted from the translator TRG to the marker MG1 through the coupler CP and the connecting circuit FC. The transmission having been realized, the translator and the connecting circuit release themselves.

The marker MG1 controls the orientating of the group selection unit ESG1 onto a feed-junctor AL. This selection being realized, the marker MG1 gets connected again to the register ED by means of a connecting circuit FC and of the coupler CP according to the same process previously indicated in order to transmit the class indication of the chosen line to the said register. In the case concerned, this line corresponds to a local group of lines; the register then knows it has to retransmit the digit T as well as the last four digits MCDU of the called-subscriber. The digits T and M are utilized to orient the group selection unit ESG2 onto a line selection unit ESL serving the dialled thousands; the last three digits CDU are utilized to orient the line selection unit ESL onto the called-subscriber AB. To transmit these various digits from the register ED to the markers MG2 and ML, the connecting circuit FC is utilized as for the first selection. The process for connecting the register with a marker is similar to that described above; the coupler CP, being informed by the register ED that a selection is going to take place, sends a signal to the selection unit ESL. The corresponding marker ML is seized, gets connected to an available connecting circuit and indicates the number of the chosen group of lines to the coupler which is connected in its turn to this connecting circuit. The sending of the digits being over, the register ED releases.

The ringing current is sent to the called-subscriber's through the feed-junctor AL and when the said subscriber answers, the call is established. The feed-junctor AL ensures that the various selectors are still in seizure and controls the release in a well-known and currently used manner when the call is over.

It will be assumed now that the dialled hundred contains one or several PBX groups. The selective indications which were established by the translator TRG after the reception of the hundreds digit, and which were received in the marker MG1, control the orientating of the group selection unit ESG1 onto a feed-junctor ALX, the latter being then connected to an intermediate register EI through the register finder CHE'. The outgoing register ED, being informed by reception of the class indication that the line chosen by ESG1 corresponds to a feed-junctor ALX, retransmits the called-subscriber complete code to the intermediate register EI. As in the previous cases, the connecting circuit is utilized to complete this transmission.

The register EI is associated, through the coupler CP' with an available local translator TRL and it transmits to the said translator an indication T characterizing the tens of thousand group in the exchange on the one hand, and the last four digits M, C, D, U on the other hand. As indicated for the register ED, the indication T is obtained, in the register EI, by translating the office code PQR. After having analysed these various indications, the translator TRL checks that the call is intended for an ordinary subscriber, i.e., a subscriber who has just one line; it sends the translated digit necessary to direct selector ESG2 onto the marker MG2, in the required direction. The register, being informed that the call is intended for an ordinary subscriber, by the class indication, sends the digit CDU over the marker of the line selection unit.

*Local call to a several-line subscriber (PBX group)*.—The operation is the same as seen previously until the local translator TRL receives the indications T MCDU. When this translator checks that the call is intended for a PBX group, it transmits, through the connecting circuit FC to the marker MG2, the selective indications necessary to orient the group selection unit ESG2 on a free line ABX of the dialled group. When the selection is completed, the ringing current is sent by the feed-junctor ALX and the call is established.

It will be noted that the local translator TRL intervenes for both the calls intended for the PBX groups and the calls intended for the ordinary subscribers, when the dialled hundreds has at least one PBX group. As a matter of fact, in this last case, it is possible to know if the call concerns a PBX subscriber only by analysing the complete code. However, in practice, the general translator could not achieve this work, because the number of the analysed digits is limited to 3 or 4 to simplify wiring.

The different advantages offered by this process of selection soon became apparent. The line selection units ESL not being utilized for the call intended for the PBX groups, the traffic that they route is appreciably lowered, hence a reduction of congestion and expenses; as a matter of fact, most of the traffic in the important exchanges is due to these groups. The group selection units ESG2 giving access to a high number of outgoings, each group practically has unlimited possibilities to be extended, by always using the same code. The codes for the PBX groups that are not used can be assigned to the ordinary subscribers; then, a series of indications for one group is not wasted as is the case in many well-known systems. Finally, the use of expensive and complex translators is avoided; as a matter of fact, the local translator TRL makes a complete analysis only for the hundreds having one or several PBX groups. The number of these hundreds can be limited by means of a suitable numbering scheme. The local translator therefore is much simplier than the subscriber general translators which systematically analyse all the codes.

The invention enables a PBX subscriber to keep the same number of lines as before and to use a series of codes left unused. These codes can be assigned to new PBX subscribers, to limit the hundreds number of demanding a complete analysis. The numbering scheme can also be progressively modified to regroup the PBX subscribers. Thus, by way of example, a PBX subscriber having a first code A will have another code B assigned to him in a hundreds having other PBX groups; after a certain lapse of time, only the code B will be utilized, the code A being merely cancelled in order to be assigned to an ordinary subscriber.

*Outgoing call.*—When after analysis of the office code PQR the general translator TRG checks that the call is intended for a distant exchange, it immediately transmits the translated digits necessary to orientate the group selection unit ESG1 onto an outgoing junctor JD to the marker MG1. The following digits necessary for the selection in the distant exchange are transmitted either from the register or the translator TRG to a sender (not shown in the figure) through the connecting circuit. And, the sender does what is necessary to the outgoing junctor JD. No more details will be given about this process as it does not enter the scope of the invention.

*Incoming call.*—An incoming call is received in a junctor JA associated with a primary selector of the group selection unit ESG1. This junctor gets connected, through a finder CHE, to a register ED. From now on, the operation is the same as that concerning a call coming from a local subscriber AB.

*Call coming from PBX subscribers.*—The PBX subscribers are connected, not only onto the banks of the group selection units EGS2, but onto those of the outgoing specialized line selection units (not shown in the figure). So, the calls coming from these subscribers can be routed.

*General translator.*—Now, by referring to the FIGURE 2, the detailed description of the general translator operation will be given. In all the following, the relay contacts have the same reference as the corresponding relay, the said reference being followed by one of the digits 1 to 9. When there are several similar circuits, just one is represented, the digit in parentheses indicating the number of these circuits.

When the translator is seized by the coupler CP for the first time, i.e., when the said translator has to analyze the office code PQR the wire N is grounded and relay *tn* energizes.

The different digits coming from the coupler CP are received in the translator according to the code "two out of five," a digit is translated by placing a ground on two wires out of five. Such a code provides 10 combinations. The translator can receive 4 digits. The first digit is registered in relays 1*a* . . . 1*e*, two and only two relays out of the five being energized. Likewise, the second digit is energized in relays 2*a* . . . 2*e*, the third digit in relays 3*a* . . . 3*e* and the fourth digit in relays 4*a* . . . 4*e*. When the translator is seized for the first time, only the three digits of the office code PQR, are received.

For decoding the second digit, 10 similar circuits *f*2 respectively corresponding to the decimal digits 0 . . . 9 are utilized, and on each of them are placed, in series, two contacts associated with the corresponding receiving relays. Thus, for instance, if the digit 1 is supposed to correspond to relays 2*a* and 2*b*, the decoding circuit of this digit includes a contact of relay 2*a* and a contact of relay 2*b*; so, by closing both these contacts, a ground is placed on one of the wires *f*2 chosen out of ten. All these decoding contacts have been indicated in a simpler way by the following references "2*a* 1 to 2*e* 1."

Each wire *f*2 is multipled, through a contact *tn*1, over ten circuits analogous to the previous ones, but utilized for decoding the first digit (1*a* 1 to 1*e* 1). So, at the output of these circuits, 100 terminals such as 2*n* are obtained, each of them characterizing a determined combination formed by the first two digits.

Each terminal 2*n* is connected, through a distributing frame RP, to a terminal 3*r*. Each of the latter is multipled over 10 decoding circuits provided for the third digit (3*a* 1 to 3*e* 1). Thus, at the output of these circuits, 1,000 terminals such as 3*s* are obtained, each of them characterizing a determined combination formed by the first three digits received; when the translator is seized for the first time, these three digits are representative of the office code PQR. In practice, the number of the terminals 3*s* is lower than 1,000; as a matter of fact, certain combinations of the first two digits may be unused.

Now, the simplest case will be considered, i.e., that concerning the first three digits PQR which are sufficient to cause the routing (case of an outgoing call.) The terminal 3*s* characterizing the dialled office code is found to be grounded through the decoding contacts of the first three digits. This terminal gets connected, through the distributing frame RP, to a terminal *g* connected to the routing relay *rg*. The latter is operated. By its contacts *rg*1 and *rg*2, the said relay grounds two out of the five wires F, which corresponds to the transmission of a first translated digit to the coupler CP; likewise, by its contacts *rg*3, *rg*4, the said relay sends a second translated digit onto two out of the five wires G. Two translated digits enable 10×10=100 possible combinations; in practice, the number of outgoing groups of lines is always smaller than this number. The circuit of relay *rg* has been represented in a more explicit way in front of the reference I.

In the case of a local call, the office code PQR is not sufficient to cause the routing; as a matter of fact, as it has been indicated, the hundreds must be known and it is necessary to know if this hundreds contains PBX groups in order to orient the group selection unit ESG1 either onto the feed-junctor ALX or the feed-junctor AL. The various terminals 3*s* corresponding to the office codes of such a type are all connected to relay *rx*. The latter energizes, in *rx*1, it grounds wire SX in order to inform the register that the translation cannot be realized at the moment here considered. The register releases the translator and waits for the two following digits MC. The circuit of relay *rx* has been represented in a more explicit way in front of the reference II.

When the register seizes the translator again, it transmits an indication T to the said translator, which indication characterizes the tens of the thousand-group in the exchange as well as the thousands and hundreds digits MC. The substitution of the office code PQR by the indication T simplifies the work of the translator. When the translator is seized for the second time, the wire X is grounded, and the wire N is not, and relay *tx* operates.

By its contacts *tx*1, relay *tx* puts decoding contacts of the first digit 1*a* 2 to 1*e* 2 in service; the said contacts are not the same as those utilized during the first seizure of the translator (1*a* 1 to 1*e* 1); so, 100 outgoing terminals 2*x* are obtained which enables to set various translations. The three digit TMC are respectively received in relays 1*a* . . . 1*e*, 2*a* . . . 2*e*, 3*a* . . . 3*e*.

If the combination TM is sufficient to indicate that the thousands does not contain any PBX group, the group selection unit ESG1 must be orientated onto a feed-junctor AL and the routing is known. The terminal 2*x* characterizing this combination is connected to the terminal *g* and from there, to relay *rg*; the latter energizes and sends the 2 translated digits onto the wires F and G as previously indicated. The circuit of relay *rg* has been represented in a more explicit way in front of the reference III. When the 3 digits TMC are necessary to know if it is either a feed-junctor AL or a feed junctor ALX which must be chosen, the terminal 3*s* characterizing the combination of the said digits is connected to a routing relay *rg* or *rf* the said relay sending the translated digits to the wires F and G. A relay *rg* is utilized for choosing a feed-junctor AL and a relay *rf* for choosing a feed-junctor ALX. The circuit of both these relays has been represented in a more explicit way in front of the reference IV.

Figure 2:
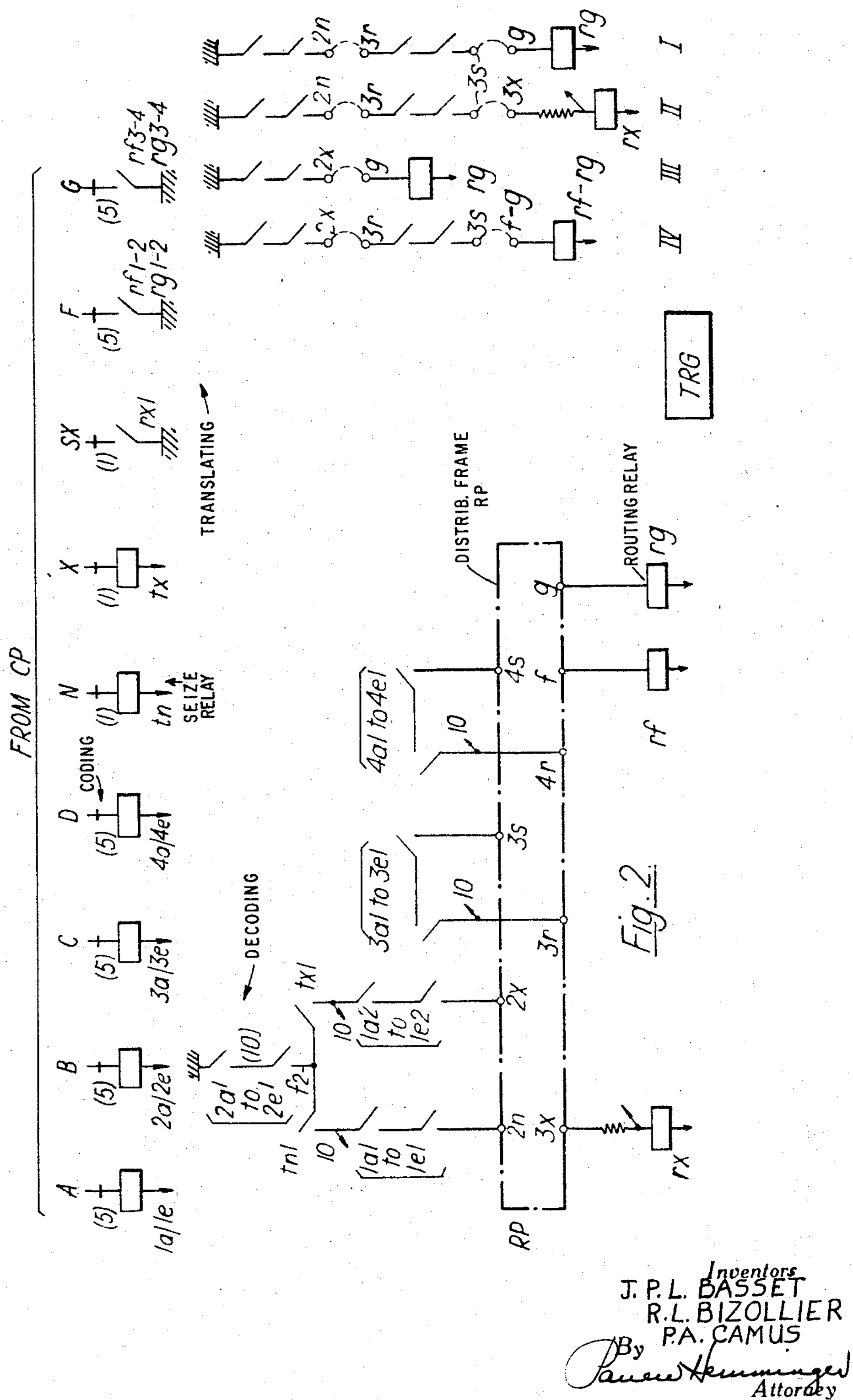
FIGURE 2, shows a simplified diagram of the general translator.

The translator in FIGURE 2 is adapted to furnish translations of four digits to indicate special services. More specifically, the translator shown in FIGURE 2 is capable of receiving a fourth digit in relays 4*a* . . . 4*e*.

It must be interesting to wait for the fourth digit for proceeding to the first seizure of the translator. It is the case, for instance, for the networks having 4-digit special services. The translator in the FIGURE 2 is adapted to such an operation since it allows to receive a fourth digit in relays 4*a* . . . 4*e*.

Figure 3:
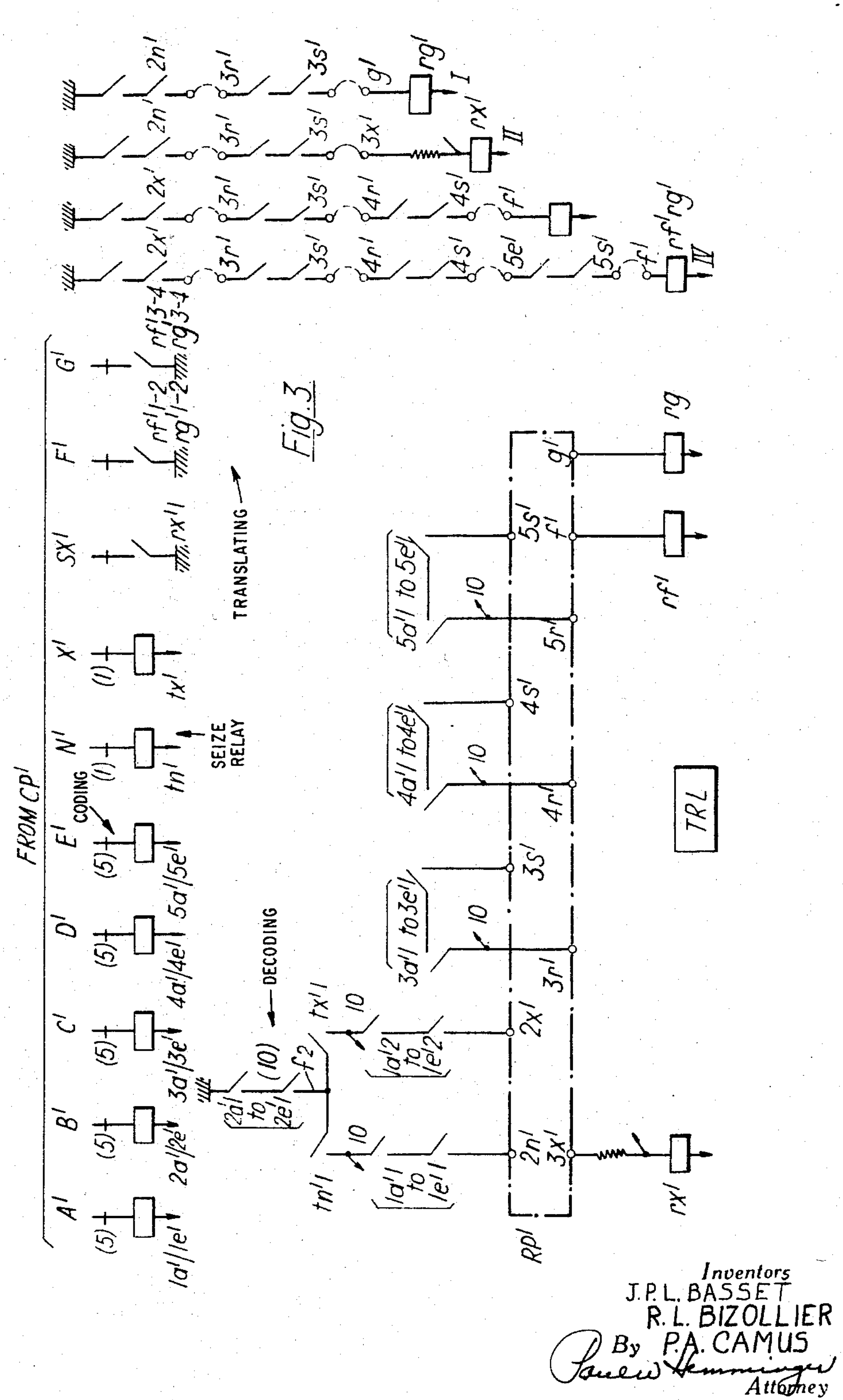
FIGURE 3, shows a simplified diagram of the local translator.

The local translator shown in the FIGURE 3 is made up in a way similar to that shown in the FIGURE 2, but it can analyse up to 5 digits. To make the comprehension easier, the units which have the same functions as those in the FIGURE 2 have been indicated by the same references of FIG. 2. The relays which receive the fourth and fifth digit have been respectively indicated by the references 4*a'* . . . 4*e'*, 5*a'* . . . 5*e'*; the corresponding decoding contacts are represented in 4*a'* 1 . . . 4*e'* 1, 5*a'* 1 . . . 5*e'* 1. All these contacts are arranged in the form of pyramids, as indicated by the decoding contacts of the first three digits. Theoretically, 10,000 terminals 4*s'* and 100,000 terminals 5*s'* are obtained, but in practice, numerous combinations are left unused. In particular, the complete analysis of the 5 digits is made only for a limited number of codes.

In the case concerning the diagram shown in the FIGURE 1, the translator TRL is seized only once. The wire *x'* is grounded and relay *tx'* operates, preparing the decoding contacts 1*a'* 2 . . . 1*e'* 2 for service in association with contacts *tx'*1 so as to make the appropriate translations. The five digits T MCDU are respectively received in the relays connected to the wires A' . . . E'. If the call is intended for an ordinary local subscriber, a relay *rg'* is energized (circuit IV) in order to send, to the wires F' and G' the translated digits necessary to orient the group selection unit ESG2 onto a line selection unit ESL serving the required thousands. If the call is intended for a PBX subscriber, a relay *rf'* is energized, (circuit IV) in order to send to the wires F' and G' the translated digits necessary to orient the group selection unit ESG2 onto the required PBX subscriber.

In both cases, it is necessary to analyse the complete code, because it is only after reception of the last digit that is known if the call is intended either for an ordinary subscriber or a PBX subscriber.

In certain particular cases, the combination TMCD may be sufficient to characterize a PBX subscriber; a relay *rf'* is therefore energized (circuit III).

Figure 4:
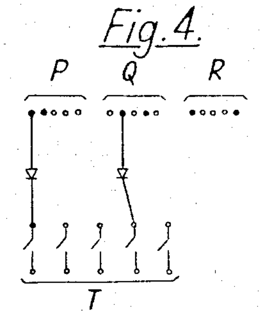
FIGURE 4, shows an example of translation of a 3-digit office code into a single code of type "two out of five"

The FIGURE 4 shows an example for the completion of translation on an office code PQR in order to obtain the indication T characterizing the tens of the thousand-group in the exchange. This translation is simple enough, since at most 5 various indications T are obtainable. In the figure, it has been supposed that the 3 digits PQR were received according to the code "two out of five"; the black dots correspond to the relays energized upon the reception of the code. In the represented example, it can be distinctly seen that it is sufficient to translate the 2 digits PQ to finally obtain the indication T into the form of a code "two out of five"; the three codes 11,000, 01010, 10001 finally are translated into the single code 10010.

Figure 5:
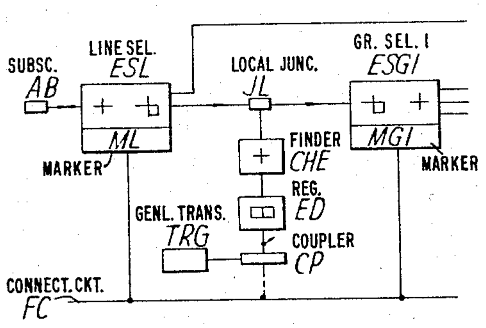
FIGURES 5 and 6, show an alternative to the block-diagram of FIGURE 1 in which the registers specialized for both the outgoing traffic and the incoming traffic are utilized.
Figures 6, 7:
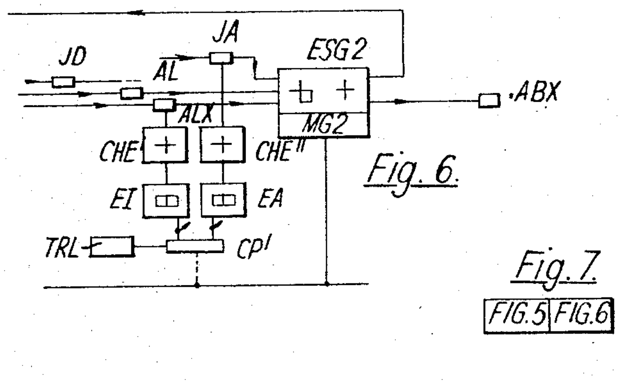
FIGURE 7, shows the scheme for uniting FIGURES 5 and 6.

In the block-diagram of the FIGURE 5 and 6, specialized registers ED are provided for the traffic coming from the local subscribers (outgoing registers) and specialized registers EA are provided for the traffic coming from the distant exchanges (incoming registers). The incoming junctors are associated with primary selectors of the group selection unit ESG2; by means of finders CHE", they give access to the incoming registers EA; by means of couplers CP', the registers EA give access to the same local translators TRL as the intermediate reigsters EI.

The case concerning a call coming from a local subscriber is identical with that already described in the block-diagram of the FIGURE 2.

In the case of an incoming call, the register EA is siezed. The latter seizes the translator TRL after reception of the hundreds digit and it transmits the combination TMC to the said translator. Relay *tn'* (FIGURE 3) then is energized, preparing the putting of the decoding contacts 1*a'* 1 . . . 1*e'* 1, in service, in *tn'*1 in order to make the required translations. If this combination is sufficient to indicate that an ordinary subscriber is concerned, relay *rg'* energizes (circuit I); the latter sends to the wires F' and G', the translated digits necessary to orient the group selection unit ESG2 to the line selection unit ESL serving the dialled thousands.

If the combination TMC is not sufficient to indicate if it is an ordinary subscriber or a PBX subscriber who is concerned, relay *rx'* is energized (circuit II); in *rx'*1, relay *rx'* places a ground on wire SX' in order to inform the register about that. The said register releases the translator and waits for the reception of the complete code. Then, the said register seizes the translator another time, energizes *tx'* and transmits T MCDU; then, we meet a case which has been already treated.

According to an alternative, standard registers can be provided for the said registers being likely to be utilized both as intermediate registers and incoming registers. In that case, the said registers are available to the feed-junctors ALX through the finders CHE' and to the incom-junctors through the finders CHE".

Figure 8:
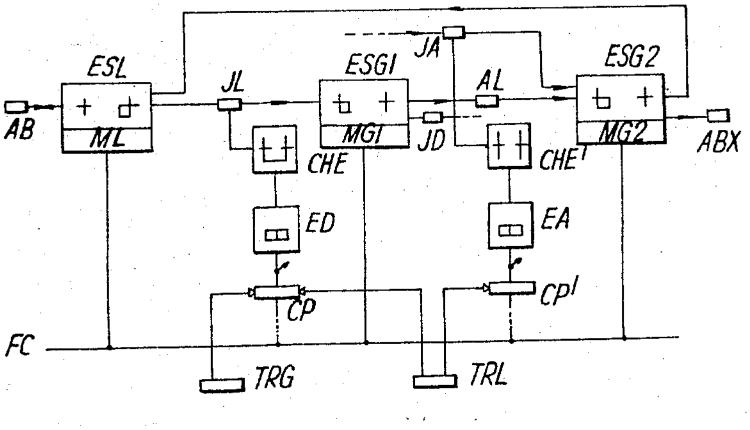
FIGURE 8, shows an alternative of the block-diagram of FIG. 1, in which the local translator is directly available for the outgoing registers as well as for the incoming registers.

In the diagram of the FIGURE 8, specialized outgoing registers ED and specialized incoming registers EA are also provided. But there is no more intermediate registers; the outgoing registers ED have access to the general translators TRG and to the local translators TRL. As indicated, the general translator TRG informs the register ED when the combination TMC is likely to concern a PBX subscriber. The register ED releases the translator and waits for the reception of the complete code. The said register then is connected to the local translator TRL by means of the coupler CP and it transmits the said code to the said translator. Then, we meet a case which has been already treated.

To obtain this operation, it is sufficient to send suitable information to the coupler CP, which said information indicates if the translator is called either for the first or the second time.

Figure 9:
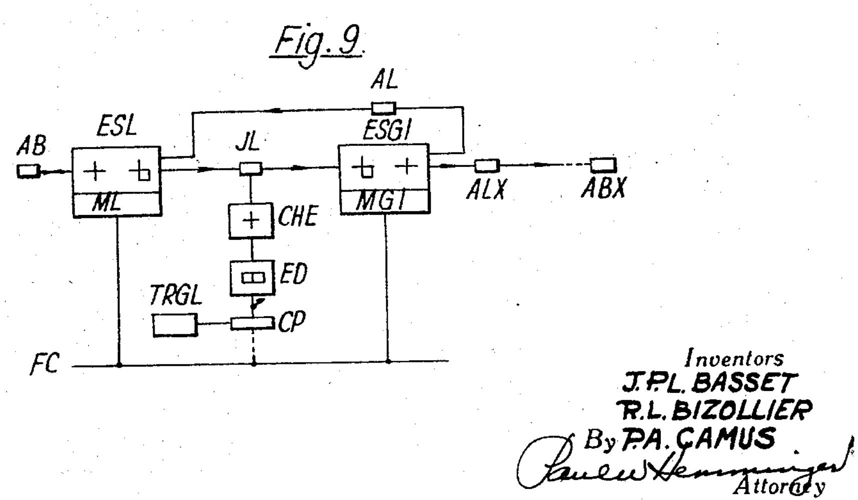
FIGURE 9, shows an alternative of the block-diagram of FIG. 1, in which an isolated exchange is concerned.

The block-diagram in the FIGURE 9 concerns the case of an isolated exchange, i.e., an exchange having no automatic connections with another exchange; the external connections then necessitate a manual intervention. There is only one group selection unit ESG1 left, the said unit giving access to the feed-junctors AL for the calls intended for ordinary subscribers and to the feed-junctors ALX for the calls intended for PBX subscribers. In such an arrangement, a feed-junctor ALX is particular to a PBX subscriber line; this is without objection as the traffic of a line of such a type is generally heavy. There are no intermediate registers; the outgoing register ED gives access, through the coupler CP, to a translator TRGL which acts both as a general translator and a local translator.

In the network, each subscriber is characterized by a 6-digit code, an office code PQ and a numerical part MCDU.

Figure 10:
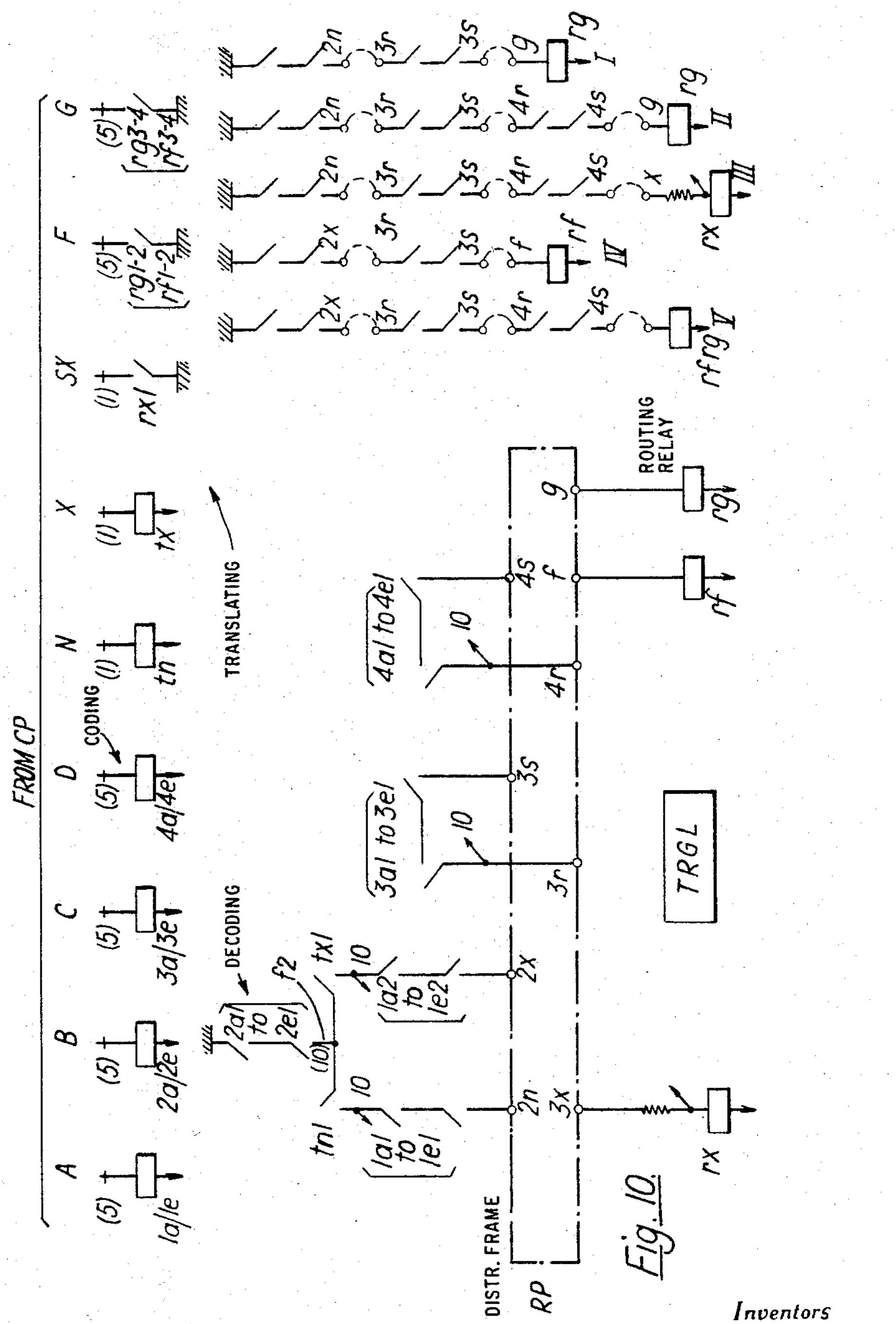
FIGURE 10, shows the simplified diagram of the local and general translator utilized in the block-diagram of FIGURE 9.

The translator TRGL is systematically seized after reception of the hundreds digit. The diagram of this translator is represented in the FIGURE 10; it is analogous to that shown in the FIGURE 2 and the units having the same functions have been indicated by the same references. Relay *tn* is energized, indicating that the first seizure is concerned. If the combination PQMC is sufficient to characterize a hundreds which has no PBX subscriber, relay *rg* is energized (circuit II); by its contacts *rg*1 . . . *rg*4, the said relay sends to the wires F and G the translated digits necessary to the orientating of the group selection unit ESG1 onto the feed-junctor AL and from there onto the line selection unit ESL serving the dialled thousands.

In certain cases, the combination PQM is sufficient to characterize a hundreds which does not contain any PBX subscriber; then, relay *rg* is energized through the circuit I. But the translator receives the combination PQMC as well, because its systematic seizure is provided for after the hundreds digit, in order not to make the circuits of the register more complex.

If the combination PQMC is not sufficient to determine whether the hundreds contains PBX subscribers or not, a relay *rx* is energized (circuit III); the said relay connects the wire SX to ground in order to inform the register about that. The said register releases the translator and waits for the reception of the complete code.

When the register seizes the translator for the second time, it connects the wire X to ground in order to operate relay *tx* and it transmits the four last digits MCDU to the translator. If the call concerns an ordinary subscriber, relay *rg* is energized; if it concerns a PBX subscriber, relay *rf* is energized (circuit V). The translated digits sent onto the wires F and G enable to orient, in each of these cases, the group selection unit ESG1 onto a convenient direction.

In certain particular cases, the combination MCD is sufficient to characterize a PBX subscriber, for that it is sufficient to analyse these digits and relay *rf* is energized through the circuit IV.

In the case the routing code PQ indicates that the call is not intended for the concerned exchange, the translator TRGL sends a selective combination to the marker MGL the said combination orientating the group selection unit ESG1 to an operator's desk (not shown in the figure). Then, the call is routed towards the distant exchange by means of the said operator.

In the previous descriptions, it has been supposed that the general translator analysed the code up to the hundreds digit, the analysing of the complete code being designed to the local translator.

It is obvious that this analysis can be distributed in different ways between the two translators. So, for instance, it is sufficient to only analyse the office code PQR in the general translator and to orient the group selection unit ESG1 accordingly.

In that case, the local translator is seized first to analyse TMC and if it is necessary, afterwards, to analyse T MCDU. There is only a displacement of the analysis pyramids.

It is clear that the preceding descriptions have only been given as an unrestrictive example and that numerous alternatives may be considered without departing from the scope of the invention. In particular the two-stage selection units of the crossbar multiswitches could be replaced by selectors of another type, such as one- or two-motion rotary selectors, linear motion selectors, all relay selectors or selectors utilizing electornic units, the invention being applicable to telephone systems of any type. Likewise, the relay translators could be replaced by translators of various types, another numbering scheme could be provided for, and the digit analysis could be carried on as long as required. In particular, the various numerical data have been mentioned only as an example, in order to make the comprehension of the operation easier, and are likely to vary with each particular case.

What is claimed is:

1. In an automatic telecommunication switching system, first and second groups of lines with the lines of each group having individual directory numbers assigned thereto, line switching means terminating the lines of the first group of lines, group switching means terminating the lines of said second group of lines, first and second control equipments, outgoing register means included in said first control equipment for registering called line directory numbers, general translating means associated with said outgoing register means in said first control equipment, intermediate register means included in said second control equipment for registering called line directory numbers, local translating means associated with said intermediate registering means in said second control equipment, said translating means in the first control equipment operated responsive to the receipt of a portion of the directory number of a called line in the first group for identifying the called line as belonging to said first group and for controlling the said line switching means to extend a connection from the calling line to the desired called line in said first group of lines responsive to the receipt of the balance of the directory numbers, means in said first control equipment operated responsive to the receipt of a portion of the directory number of a called line in the said second group of lines for transferring the received portion of the directory number to the said second control equipment, and means in the second control equipment including said local translating means operated responsive to the receipt of the directory number of a called line in said second group of lines to control the said group and line switching means to extend a connection from the calling line to the desired called line.

2. An automatic telecommunication switching system as set forth in claim 1, and means in said general translating means included in said first control equipments for determining if the first portion of the directory number includes any directory numbers of lines in said second group.

3. An automatic telecommunication system as set forth in claim 2 and means in the said general translating means of the first control equipment for evaluating the registered directory number to determine the one of the said groups containing the called line.

4. An automatic telecommunication system as set forth in claim 2 wherein groups of trunk lines are served by said group and line switching means and means in the first and second control equipments for controlling the said group and line switching means to extend connections from a calling trunk line of said groups of trunk lines to the desired called line in either of said groups of lines.

5. An automatic telecommunication system as set forth in claim 3 wherein the said translating means of said first control equipment translates the registered directory number into switch locational information and means for transferring said locational information in coded form to the said second control equipment on calls to lines in said second group of lines.

References Cited by the Examiner

UNITED STATES PATENTS

| | | | |
|---|---|---|---|
| 2,706,749 | 4/1955 | Krom | 179—18 |
| 2,834,835 | 5/1958 | Shepherd | 179—18.211 |
| 2,918,533 | 12/1959 | Leonard et al. | 179—18.211 |
| 2,928,903 | 3/1960 | Bellamy et al. | 179—18 |
| 2,932,695 | 4/1960 | Gohorel | 179—18.211 |
| 2,998,493 | 8/1961 | Gibson | 179—18 |

KATHLEEN H. CLAFFY, *Primary Examiner.*

WALTER L. LYNDE, ROBERT H. ROSE, *Examiners.*

H. BOOHER, J. JOHNSON, S. J. BOR, *Assistant Examiners.*